(12) United States Patent
Lin

(10) Patent No.: US 12,360,575 B2
(45) Date of Patent: Jul. 15, 2025

(54) DUAL AXIS SLIDER HINGE

(71) Applicant: SHIN ZU SHING CO., LTD., New Taipei (TW)

(72) Inventor: Ming Chin Lin, New Taipei (TW)

(73) Assignee: SHIN ZU SHING CO., LTD., New Taipei (TW)

( * ) Notice: Subject to any disclaimer, the term of this patent is extended or adjusted under 35 U.S.C. 154(b) by 200 days.

(21) Appl. No.: 18/227,195

(22) Filed: Jul. 27, 2023

(65) Prior Publication Data

US 2025/0036168 A1    Jan. 30, 2025

(51) Int. Cl.
*G06F 1/16*    (2006.01)

(52) U.S. Cl.
CPC .................................. *G06F 1/1681* (2013.01)

(58) Field of Classification Search
CPC .... G06F 1/1652; G06F 1/1681; G06F 1/1616; H04M 1/0268
See application file for complete search history.

(56) References Cited

U.S. PATENT DOCUMENTS

| | | | | |
|---|---|---|---|---|
| 638,884 | A * | 12/1899 | Perry | E05D 3/022 16/361 |
| 8,627,546 | B2 * | 1/2014 | Zhang | H04M 1/022 16/371 |
| 10,394,062 | B1 * | 8/2019 | Song | G02F 1/133308 |
| 10,831,242 | B1 * | 11/2020 | He | H05K 5/0226 |
| 10,928,864 | B1 * | 2/2021 | Sanchez | E05D 11/1028 |
| 11,408,214 | B1 * | 8/2022 | Hsu | H04M 1/022 |
| 12,066,872 | B2 * | 8/2024 | Kim | G06F 1/16 |
| 2020/0359514 | A1 * | 11/2020 | Lin | H04M 1/0268 |
| 2020/0371561 | A1 * | 11/2020 | Lin | E05D 3/18 |
| 2021/0096608 | A1 * | 4/2021 | Hallar | E05D 11/1028 |
| 2021/0247814 | A1 * | 8/2021 | Nguyen | G06F 1/1616 |
| 2021/0250431 | A1 * | 8/2021 | Park | G06F 1/1652 |
| 2021/0307185 | A1 * | 9/2021 | Hong | G06F 1/1652 |
| 2021/0333838 | A1 * | 10/2021 | Song | G06F 1/1652 |
| 2021/0355988 | A1 * | 11/2021 | Cheng | G06F 1/1681 |
| 2022/0346257 | A1 * | 10/2022 | Liu | F16C 11/045 |

(Continued)

FOREIGN PATENT DOCUMENTS

| | | | | |
|---|---|---|---|---|
| CN | 117366095 A | * | 1/2024 | |
| EP | 2421231 A1 | * | 2/2012 | ........... G06F 1/1616 |

(Continued)

*Primary Examiner* — Emily M Morgan
(74) *Attorney, Agent, or Firm* — Birch, Stewart, Kolasch & Birch, LLP

(57) ABSTRACT

A dual axis slider hinge has a fixing base, two sliders, two holders, and a link unit. The fixing base has two sockets and a positioning hole, and each of the two sockets has two straight tracks. Each of the sliders has two lateral sliding grooves, a holder connecting portion, and an inner sliding slot. The sliders are respectively mounted in the sockets, and the lateral sliding grooves engage with the straight tracks. Each of the holders has a connecting plug and a combining portion, and the connecting plug is pivotably connected to the holder connecting portion. The link unit has two connecting portions and a rotating portion. Each of the connecting portions has a connecting pin. The connecting pins are movably mounted in the inner sliding slots respectively, thereby synchronizing the two holders via the link unit to flip simultaneously.

10 Claims, 12 Drawing Sheets

(56) References Cited

U.S. PATENT DOCUMENTS

| | | | | |
|---|---|---|---|---|
| 2022/0365568 A1* | 11/2022 | Torres | ............... | E05D 3/16 |
| 2022/0413562 A1* | 12/2022 | Kim | ............... | G06F 1/1652 |
| 2023/0063210 A1* | 3/2023 | Hsu | ............... | G06F 1/1652 |
| 2023/0115172 A1* | 4/2023 | Lombardi | ........... | H10K 59/00 |
| | | | | 361/679.27 |
| 2023/0179689 A1* | 6/2023 | Kim | ............... | H04M 1/0216 |
| 2023/0244274 A1* | 8/2023 | Lin | ............... | G06F 1/1641 |
| | | | | 361/679.27 |
| 2023/0393632 A1* | 12/2023 | Hong | ............. | G06F 1/1681 |
| 2024/0019911 A1* | 1/2024 | Liu | ............... | G06F 1/1681 |
| 2024/0176395 A1* | 5/2024 | Wang | ............. | G06F 1/1616 |
| 2024/0288902 A1* | 8/2024 | You | ............... | F16C 11/04 |
| 2024/0310882 A1* | 9/2024 | Wu | ............... | G06F 1/1681 |
| 2024/0402758 A1* | 12/2024 | Liu | ............... | H04M 1/022 |
| 2024/0419221 A1* | 12/2024 | Xu | ............... | G06F 1/1652 |
| 2025/0013268 A1* | 1/2025 | Zhan | ............. | H04M 1/0216 |

FOREIGN PATENT DOCUMENTS

| | | | | |
|---|---|---|---|---|
| KR | 102311588 B1 * | 10/2021 | | |
| WO | WO-2021162212 A1 * | 8/2021 | ........... | G06F 1/1616 |
| WO | WO-2022039371 A1 * | 2/2022 | ............. | F16C 11/04 |
| WO | WO-2023239065 A1 * | 12/2023 | ........... | G06F 1/1616 |

\* cited by examiner

DUAL AXIS SLIDER HINGE

1. FIELD OF THE INVENTION

The present invention relates to a hinge, especially to a hinge for electronic devices.

2. DESCRIPTION OF THE PRIOR ARTS

To improve convenience and still comprise a certain sized screen, a development trend of portable electronic devices such as laptops and smart phones is to have foldability. Considering the feel of holding a portable electronic device, an overall goal of structurally improving the portable electronic device is to reduce weight and volume.

As shown in FIG. 12, a conventional dual axis hinge includes a basal body 90, two pivot assemblies 91, and multiple gears 92. Multiple axle holes are formed through two opposite ends of the basal body 90, and two rotating axles pass through the axle holes. With the two pivot assemblies 91 mounted on the basal body 90 and the gears 92 engaging with each other, synchronized rotations of the two pivot assemblies 91 are accomplished.

However, since the pivot assemblies 91 and the gears 92 are heavy and large-sized, the aforementioned structure gets large in size and weight, and therefore, the conventional dual axis hinge does not match the goal of slimming down the portable electronic device.

To overcome the shortcomings, the present invention provides a dual axis slider hinge to mitigate or obviate the aforementioned problems.

SUMMARY OF THE INVENTION

The main objective of the present invention is to provide a dual axis slider hinge that has two holders, two sliders, and a link unit mounted on a fixing base to perform synchronized flipping movements of the two holders.

The dual axis slider hinge has a fixing base, and the fixing base has two sockets and a positioning hole. The two sockets are respectively located at two opposite lateral sides of the positioning hole. Each one of the two sockets has an inlet and two straight tracks. The two inlets of the two sockets are recessed in two opposite sides of the fixing base respectively. The two straight tracks protrude from two opposite lateral walls of said socket.

Two sliders are mounted in the two sockets respectively, and each one of the two sliders has two lateral sliding grooves, a holder connecting portion, and an inner sliding slot. The two lateral sliding grooves are formed on two opposite lateral surfaces of an end portion of said slider respectively. The holder connecting portion is located at another end portion of said slider. The inner sliding slot is recessed from a surface of said slider and extends toward two opposite lateral sides of said slider. Each one of the two lateral sliding grooves engages with a respective one of the two straight tracks, and the holder connecting portion is disposed adjacent to the inlet.

Each one of the two holders has a connecting plug and a combining portion. The connecting plug of each one of the two holders is pivotably connected to the holder connecting portion of a respective one of the two sliders.

A link unit has two connecting portions and a rotating portion. The two connecting portions are located at two opposite sides of the rotating portion respectively, and the two connecting portions bend toward two opposite directions away from each other. Each one of the two connecting portions includes a connecting pin protruding from said connecting portion. The rotating portion includes a rotating stick protruding from a surface of the link unit, and the rotating stick is rotatably mounted through the positioning hole of the fixing base. Each one of the two connecting pins of the two connecting portions is movably mounted in the inner sliding slot of the respective one of the two sliders.

The dual axis slider hinge is capable of synchronizing the two holders to slide and flip simultaneously via the link unit, and the link unit is capable of limiting a rotating angle. Compared with the conventional dual axis hinge, the dual axis slider hinge is lighter and smaller without heavy or large units such as gears, thereby reducing the volume, weight, and manufacturing cost.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
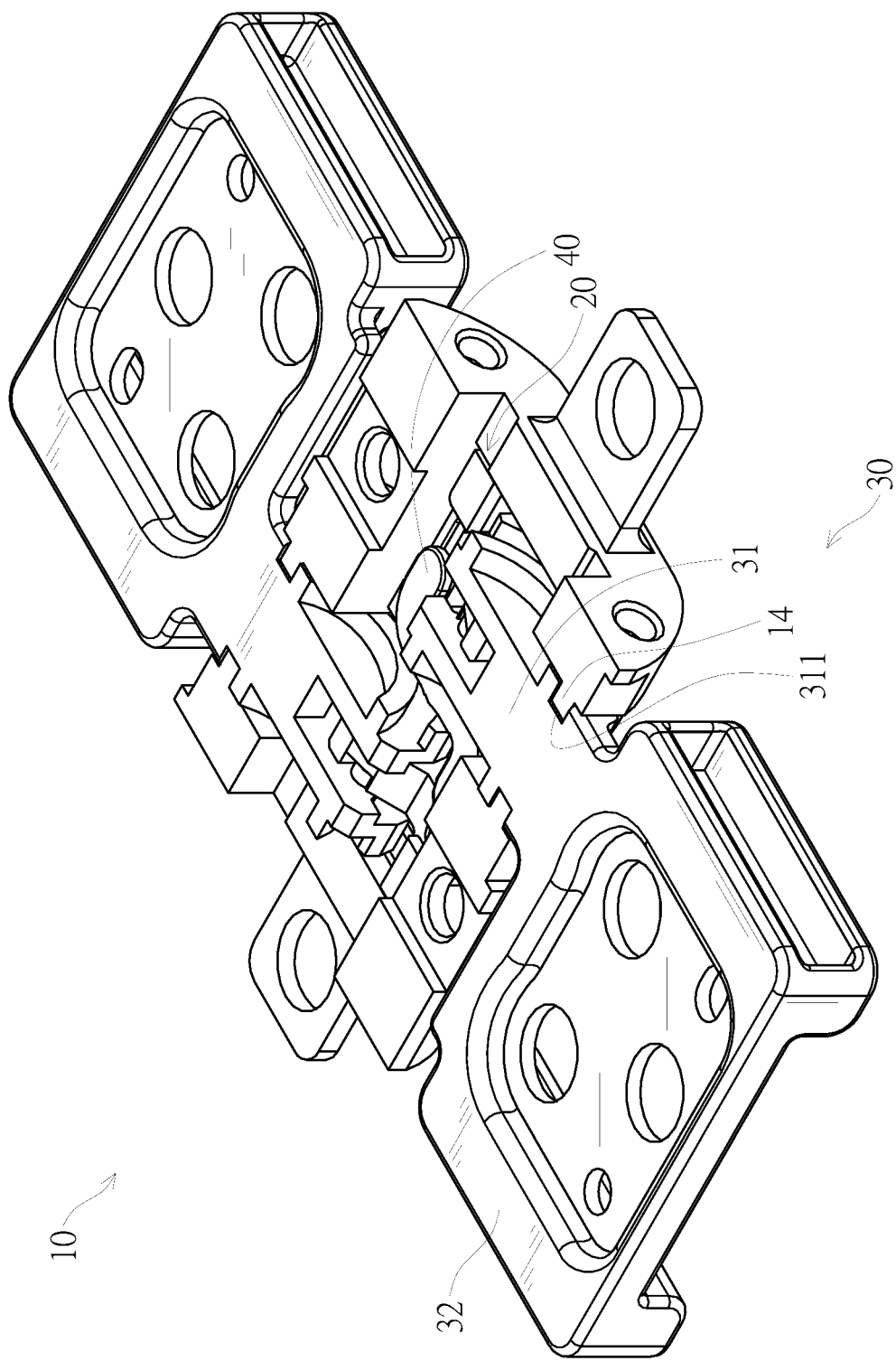
FIG. 1 is a perspective view of a dual axis slider hinge in accordance with the present invention.

With reference to FIG. 1, a dual axis slider hinge in accordance with the present invention includes a fixing base 10, two sliders 20, two holders 30, and a link unit 40.

Figure 2:
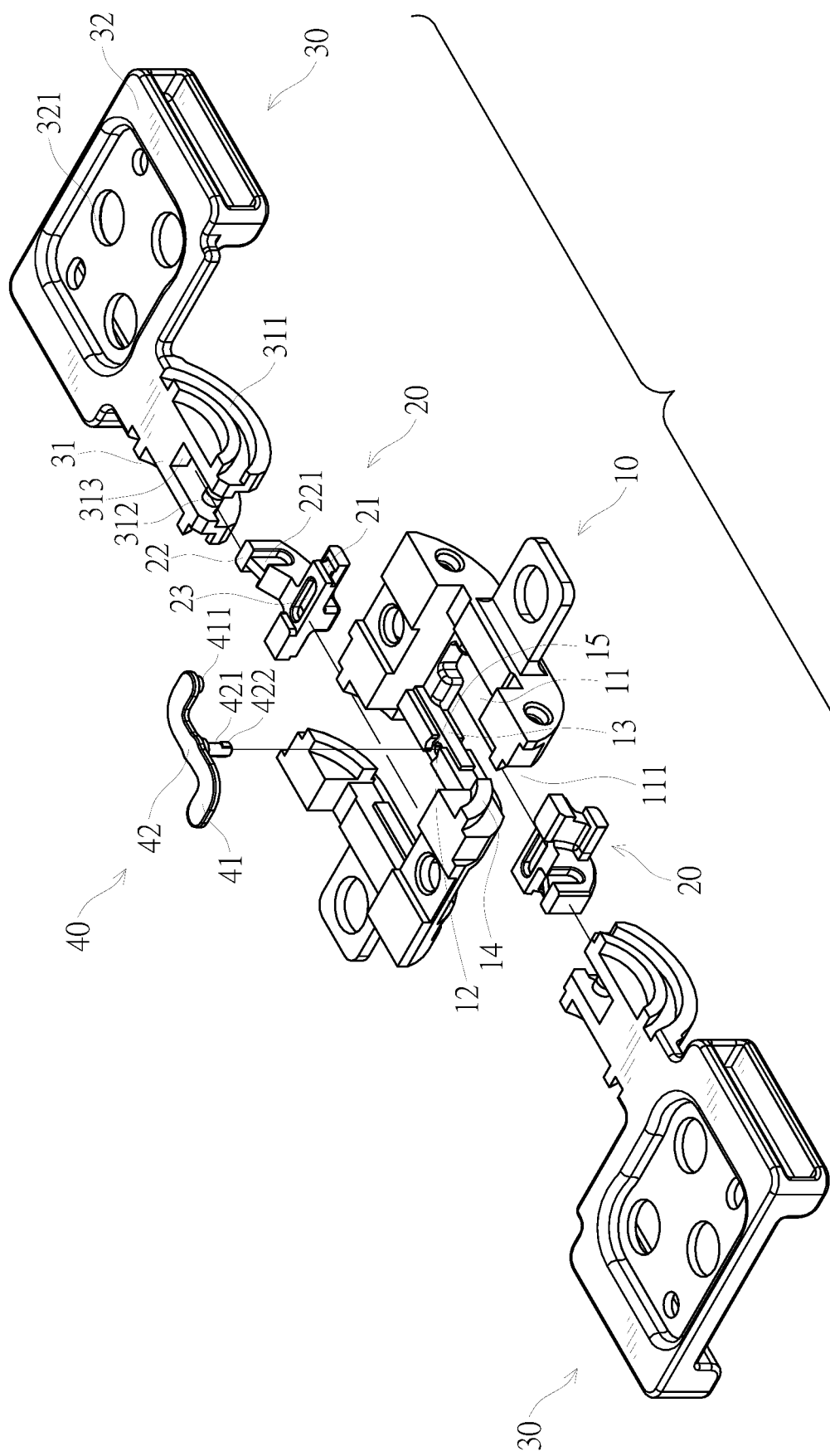
FIG. 2 is an exploded view of the dual axis slider hinge in FIG. 1.
Figure 3:
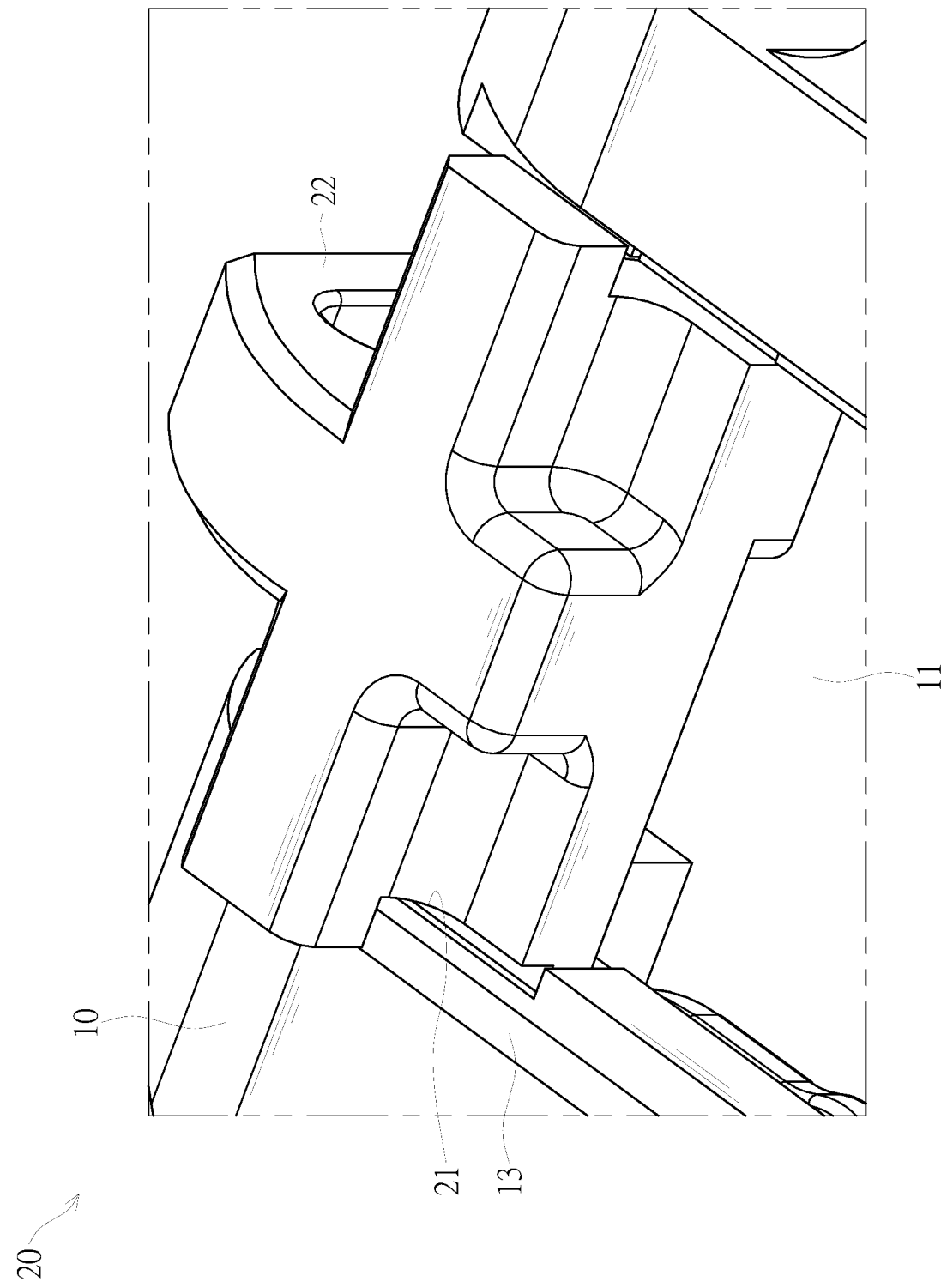
FIG. 3 is a partial enlarged view of the dual axis slider hinge in FIG. 1, showing a slider engaging with a socket.
Figure 4:
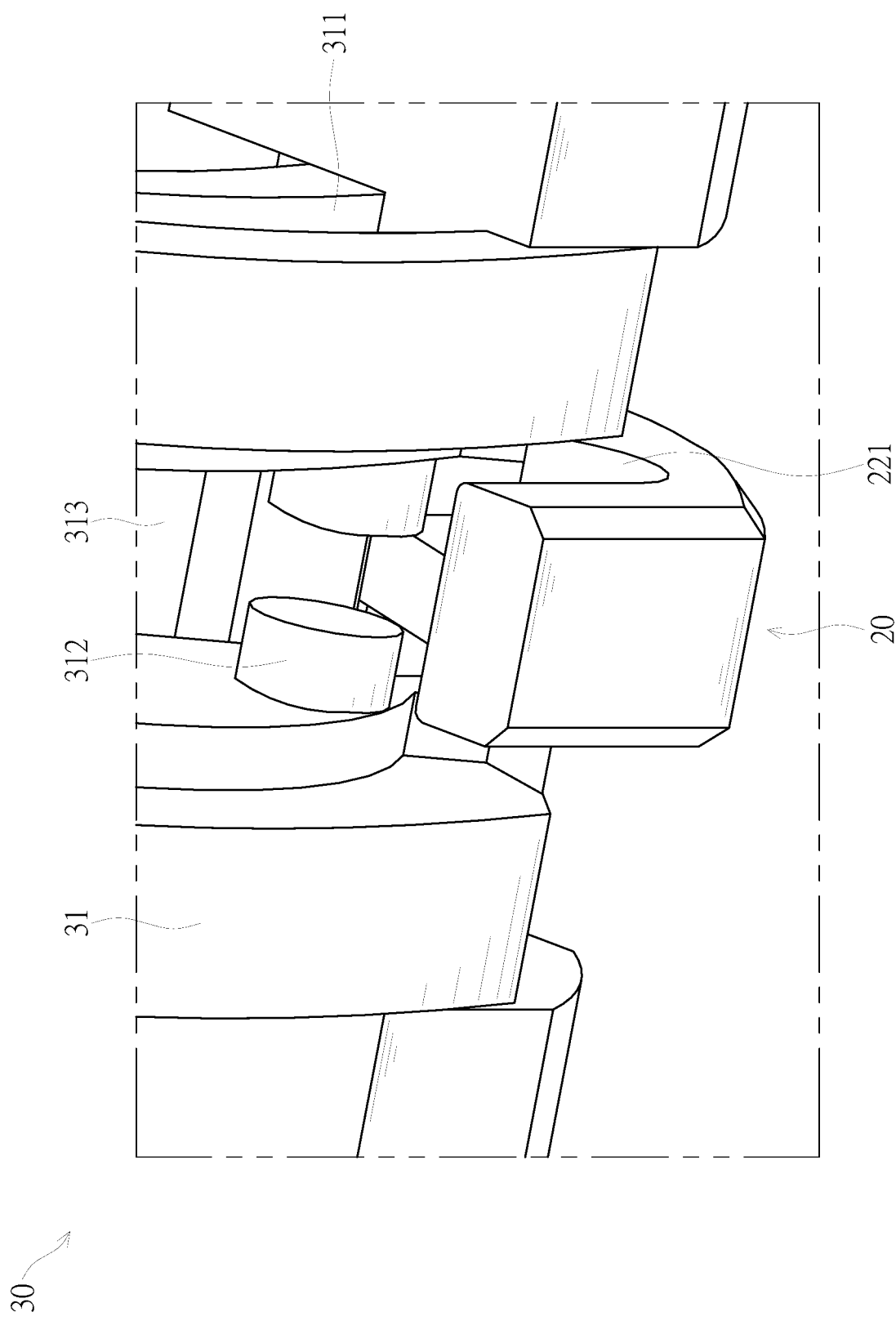
FIG. 4 is a partial enlarged view of the dual axis slider hinge in FIG. 1.
Figure 5:
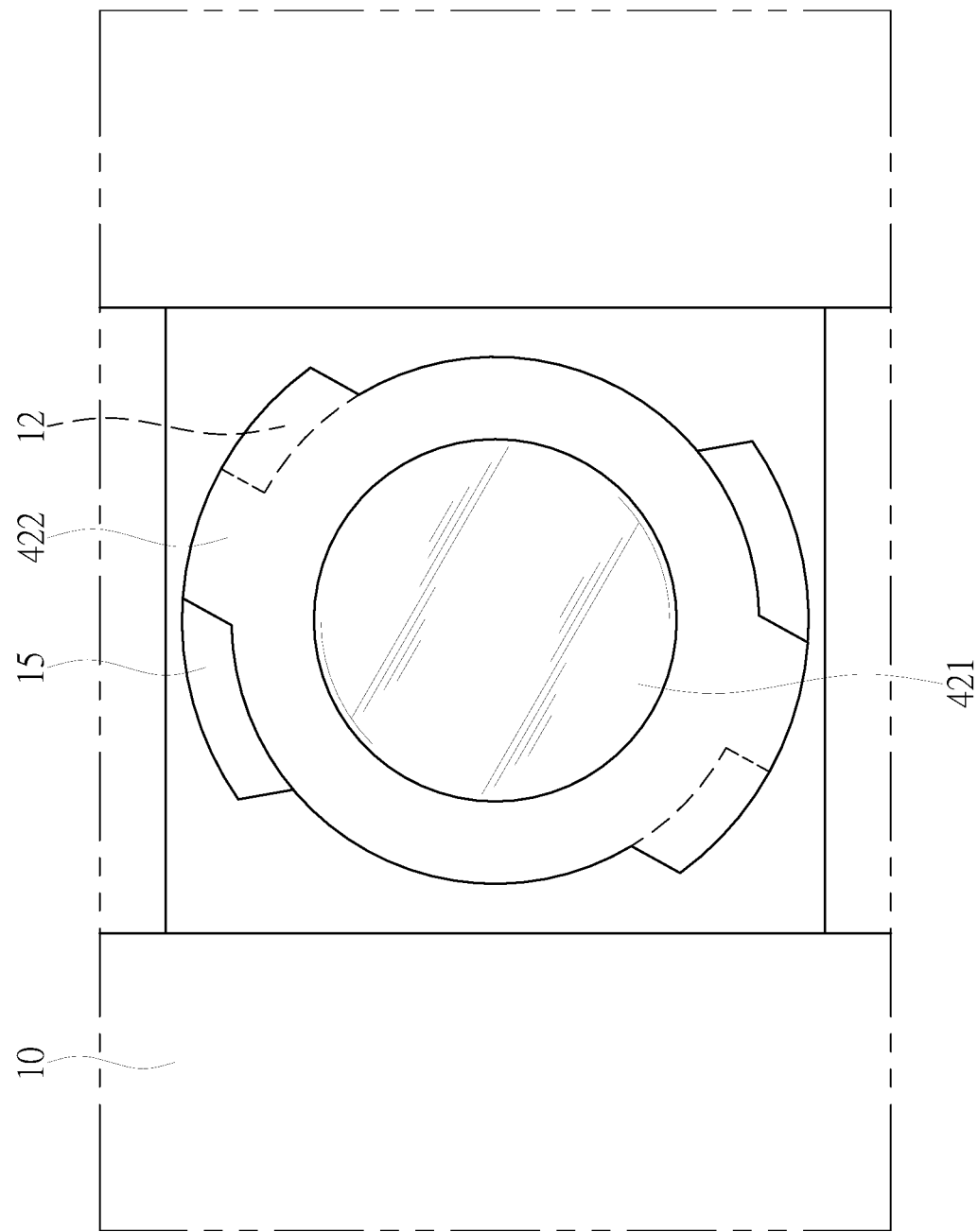
FIG. 5 is another partial enlarged view of the dual axis slider hinge in FIG. 1.

With reference to FIGS. 1 and 2, the fixing base 10 has two sockets 11 and a positioning hole 12. The two sockets 11 are respectively located at two opposite lateral sides of the positioning hole 12. Each one of the two sockets 11 has an inlet 111, and the two inlets 111 of the two sockets 22 are recessed in two opposite sides of the fixing base 10 respectively. Each one of the two inlets 111 spatially communicates with the socket 11.

Two straight tracks 13 and two curved tracks 14 are formed in each one of the two sockets 11. The two straight tracks 13 and the two curved tracks 14 protrude from two opposite lateral walls of a corresponding one of the two sockets 11. The straight tracks 13 in each one of the sockets 11 extend toward the inlet 111, and each one of the curved tracks 14 is located between the inlet 111 and a corresponding one of the straight tracks 13.

In this embodiment, two angle limiting grooves 15 are formed at the positioning hole 12, and the two angle limiting grooves 15 are recessed in two opposite sides of the positioning hole 12. Each one of the curved tracks 14 is an arced track subtended to a 90-degree central angle, but is not limited thereto, as a configuration of the fixing base 10 may be altered on demand.

With reference to FIGS. 2 to 5, each one of the sliders 20 has two lateral sliding grooves 21, a holder connecting portion 22, and an inner sliding slot 23. The two lateral sliding grooves 21 are formed on and recessed from two opposite lateral surfaces respectively of an end portion of the slider 20, and the holder connecting portion 22 is located at another end portion of the slider 20, 12

In this embodiment, two pivot slots 221 are formed on and recessed from two opposite lateral surfaces respectively of the holder connecting portion 22, and the two pivot slots 221 extend along a direction perpendicular to extending directions of the two the lateral sliding grooves 21. The inner sliding slot 23 is recessed from a surface of the slider 20 and extends toward two opposite lateral sides of the slider 20; in other words, in a three-dimensional coordinate system, the lateral sliding groove 21, the inner sliding slot 23, and the pivot slot 221 extend along the three axes of the three-dimensional coordinate system respectively.

The two sliders 20 are mounted in the two sockets 11 respectively, and each one of the lateral sliding grooves 21 engages with a respective one of the two straight tracks 13, and the holder connecting portion 22 is disposed adjacent to the inlet 111, but it is not limited thereto, as a configuration of the slider 20 may be altered on demand.

Each one of the two holders 30 has a connecting plug 31 and a combining portion 32, and the connecting plug 31 and the combining portion 32 are located at two opposite ends of the holder 30 respectively. The connecting plug 31 has two curved grooves 311 and two pivot pins 312, and the two curved grooves 311 are recessed from two opposite lateral surfaces of the connecting plug 31 respectively, and a shape of each one of the two curved grooves 311 corresponds to a shape of each one of the two curved tracks 14 of the corresponding socket 11. An engaging recess 313 is recessed in an end portion of the connecting plug 31, and two pivot pins 312 are formed in the engaging recess 313; to be more precise, the two pivot pins 312 protrude from two lateral wall surfaces respectively in the engaging recess 313.

The combining portion 32 is a board, and multiple combining holes 321 are formed through the board, but it is not limited thereto, as a configuration of the holder 30 may be altered on demand. The connecting plug 31 of each one of the two holders 30 is movably connected to the holder connecting portion 22 of a corresponding one of the two sliders 20; to be more precise, the pivot pins 312 of the connecting plug 31 are movably mounted in the two pivot slots 221 respectively of each one of the two sliders 20, and thereby the holder 30 is pivotably connected to the slider 20 and capable of pivoting with respect to the two pivot pins 312.

The link unit 40 has two connecting portions 41 and a rotating portion 42. The two connecting portions 41 are located at two opposite sides of the rotating portion 42, and the two connecting portions 41 bend toward two opposite directions away from each other. Each one of the two connecting portions 41 has a connecting pin 411, and the two connecting pins 411 of the two connecting portions 41 protrude from surfaces of the two connecting portions 41 respectively, and said surfaces of the two connecting portions 41 face toward same direction.

The rotating portion 42 includes a rotating stick 421 which protrudes from a surface of the link unit 40. Two locking units 422 are formed at an end portion of the rotating stick 421, and the two locking units 422 protrude from an outer surface of the rotating stick 421. The two locking units 422 are located opposite to each other. The rotating stick 421 is rotatably mounted through the positioning hole 12 of the fixing base 10, and the two locking units 422 are disposed in the two angle limiting grooves 15 respectively, and thereby the link unit 40 is rotatable with respect to the fixing base 10. Furthermore, each one of the connecting pins 411 is movably mounted in the inner sliding slot 23 of one of the sliders 20. In this embodiment, the link unit 40 is S-shaped, but it is not limited thereto.

A continuous operation of the dual axis slider hinge is described as follows, assuming the dual axis slider hinge is mounted on an imaginary portable electronic device which is not shown in the drawings.

Figure 6:
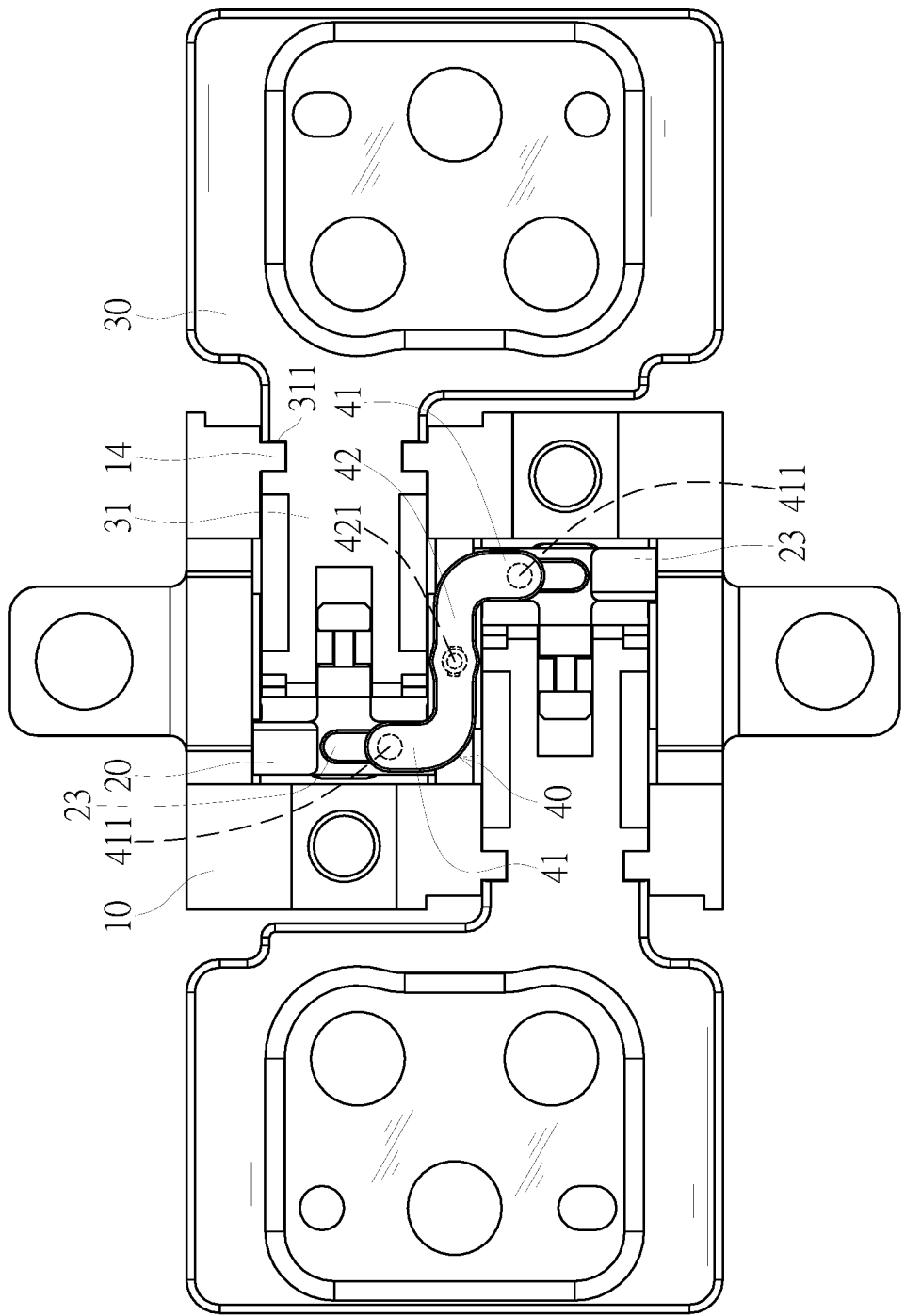
FIG. 6 is a top view of the dual axis slider hinge in FIG. 1, shown expanded for 180 degrees.
Figure 7:
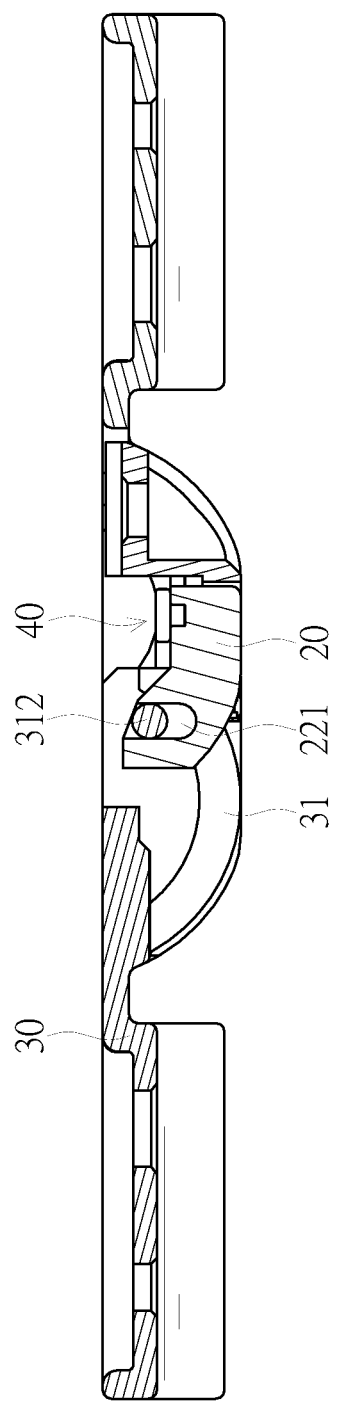
FIG. 7 is a cross-sectional side view of FIG. 6.

As shown in FIGS. 6 and 7, an angle between the two holders 30 is 180 degrees, i.e., the dual axis slider hinge is under an expanded state, and a top surface of the fixing base 10 is level with two top surfaces of the two holders 30, and each one of the two sliders 20 abuts an inner wall surface of the corresponding socket 11 of the fixing base 10. Each one of the two connecting pins 411 of the link unit 40 abuts a part of a lateral surface of the inner sliding slot 23 of the corresponding slider 20, and the part of the lateral surface is adjacent to the positioning hole 12. Each one of the pivot pins 312 is located at an end adjacent to an opening of the corresponding pivot slot 221.

Figure 8:
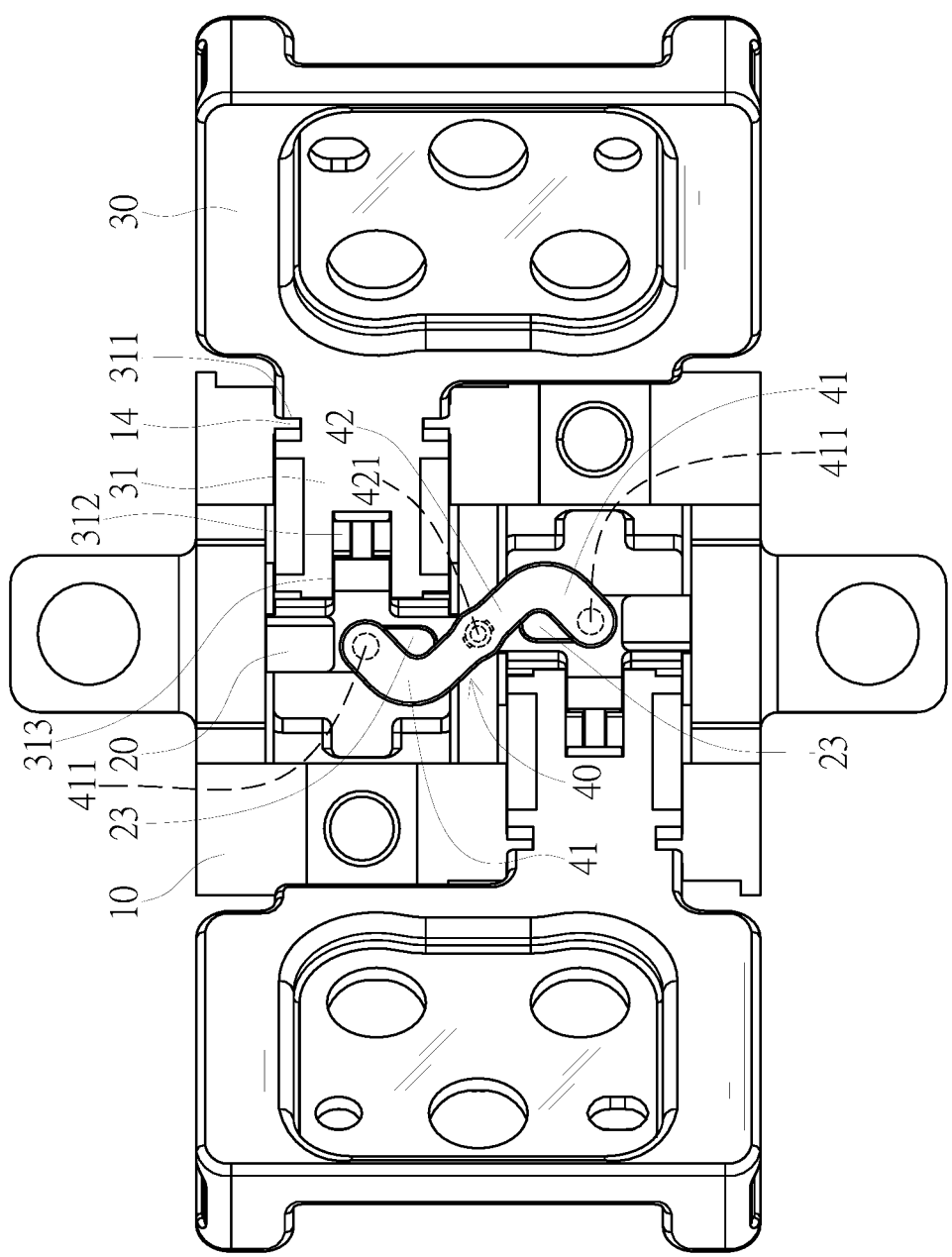
FIG. 8 is a top view of the dual axis slider hinge in FIG. 1, shown expanded for 90 degrees.
Figure 9:
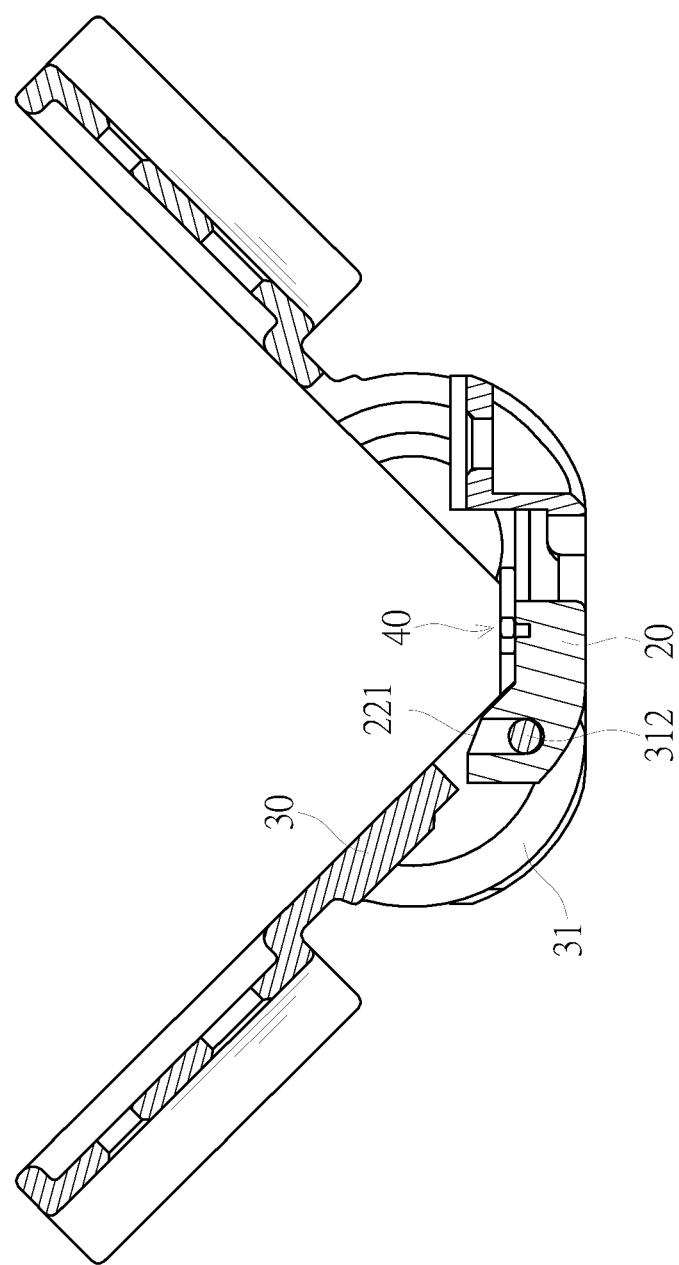
FIG. 9 is a cross-sectional side view of FIG. 8.

Next, as shown in FIGS. 8 and 9, the angle between the two holders 30 is 90 degrees. While the two holders 30 are pivoting to approach each other, each one of the sliders 20 moves along the straight tracks 13 toward the inlet 111 of the corresponding socket 11, and the link unit 40 rotates with respect to the rotating stick 421. Each one of the two connecting pins 411 moves and abuts another part of the lateral surface of the inner sliding slot 23 of the corresponding slider 20, and said part of the lateral surface is away from the positioning hole 12. The connecting plug 31 of each one of the holders 30 slides along the curved tracks 14, and thereby the holders 30 are capable of pivoting about imaginary rotating axles as the conventional dual axis hinge.

Figure 10:
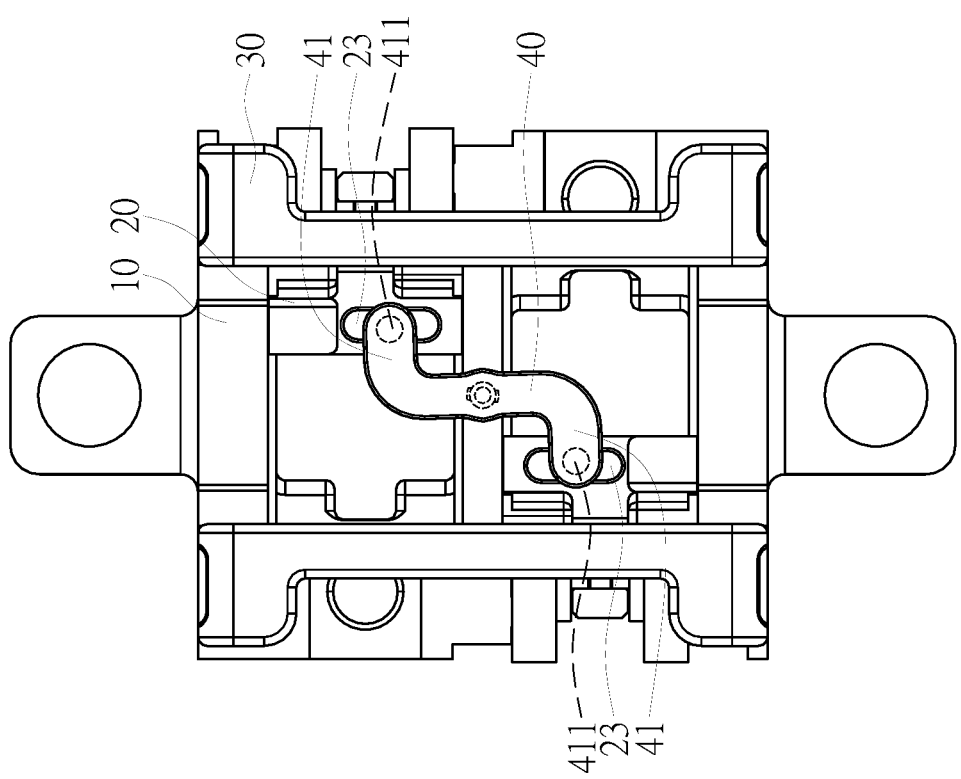
FIG. 10 is a top view of the dual axis slider hinge in FIG. 1, shown folded.
Figure 11:
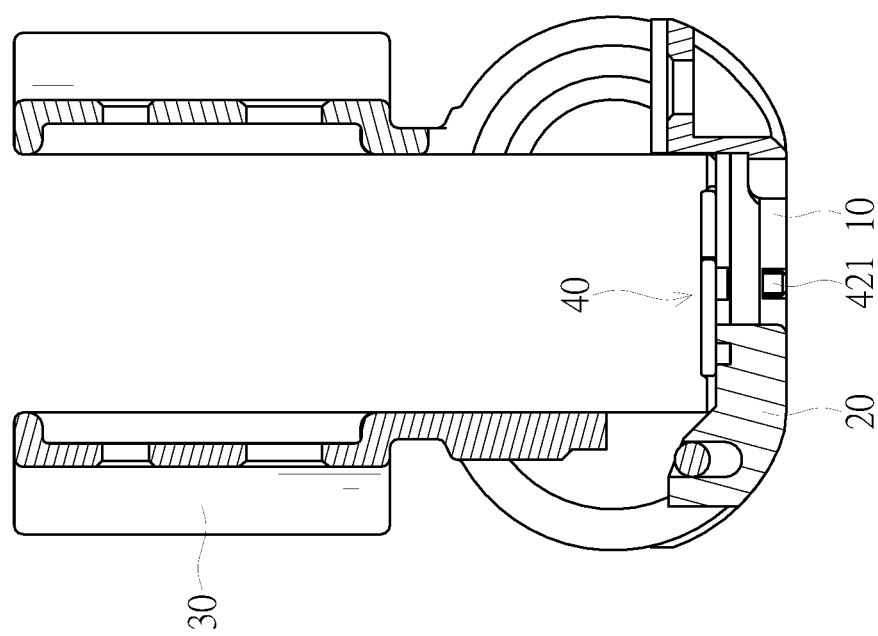
FIG. 11 is a cross-sectional side view of FIG. 10.
Figure 12:
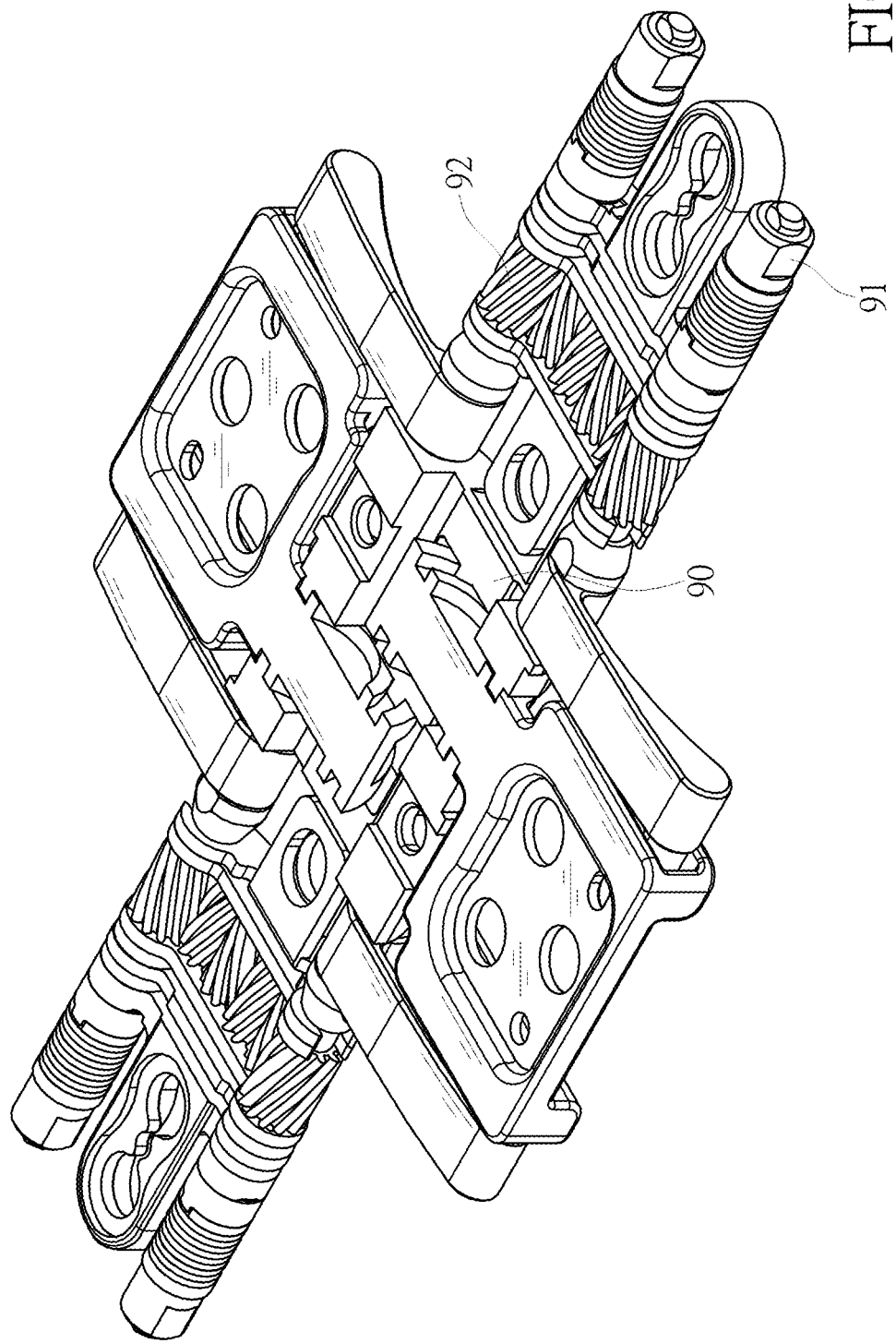
FIG. 12 is a perspective view of a conventional dual axis hinge.

Next, as shown in FIGS. 10 and 11, the angle between the two holders 30 is 0 degree, i.e., the dual axis slider hinge is in a closed state. While the two holders 30 are pivoting to approach each other, each one of the sliders 20 keeps moving along the straight tracks 13 toward the inlet 111 of the corresponding socket 11, and the link unit 40 continues rotating with respect to the rotating stick 421. The link unit 40 totally rotates about 90 degrees from the expanded state to the closed state of the dual axis slider hinge. Each one of the two connecting pins 411 moves back to about a middle of the corresponding inner sliding slot 23, and connecting plugs 31 of the holders 30 keep sliding along the curved tracks 14.

In the aforementioned process, the two holders 30 are synchronized to slide along the curved tracks 14 and to flip via the link unit 40; besides, the link unit 40 is capable of limiting a rotating angle. Therefore, compared with a conventional dual axis hinge, the dual axis slider hinge is lighter and smaller without heavy or big units such as gears, thereby reducing a total volume, weight, and manufacturing cost.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A dual axis slider hinge comprising:
    a fixing base having two sockets and a positioning hole;
        the two sockets respectively located at two opposite lateral sides of the positioning hole, and each one of the two sockets having:
            an inlet, and the two inlets of the two sockets respectively recessed in two opposite sides of the fixing base; and
            two straight tracks formed on and protruding from two opposite lateral walls of said socket;
    two sliders respectively mounted in the two sockets, and each one of the two sliders having:
        two lateral sliding grooves respectively formed on two opposite lateral surfaces of an end portion of said slider; each one of the two lateral sliding grooves engaging with a respective one of the two straight tracks;
        a holder connecting portion located at another end portion of said slider, and the holder connecting portion disposed adjacent to the inlet;
        an inner sliding slot recessed from a surface of said slider and extending toward two opposite lateral sides of said slider;
    two holders, and each one of the two holders having:
        a connecting plug and a combining portion; the connecting plug pivotably connected to the holder connecting portion of a respective one of the two sliders; and
    a link unit having:
        a rotating portion including:
            a rotating stick protruding from a surface of the link unit, and the rotating stick rotatably mounted through the positioning hole of the fixing base, thereby the link unit being rotatable with respect to the fixing base; and
        two connecting portions respectively located at two opposite sides of the rotating portion, and the two connecting portions bending toward two opposite directions away from each other; each one of the two connecting portions including:
            a connecting pin protruding from said connecting portion, and the connecting pin movably mounted in the inner sliding slot of a respective one of the two sliders.

2. The dual axis slider hinge as claimed in claim 1, wherein each one of the two straight tracks extends toward the inlet.

3. The dual axis slider hinge as claimed in claim 1, wherein:
    two angle limiting grooves are formed at the positioning hole, and the two angle limiting grooves are recessed in two opposite sides of the positioning hole; and
    two locking units are formed at an end portion of the rotating stick, protrude from an outer surface of the rotating stick and are located opposite to each other, and are respectively disposed in the two angle limiting grooves.

4. The dual axis slider hinge as claimed in claim 2, wherein:
    two angle limiting grooves are formed at the positioning hole, and the two angle limiting grooves are recessed in two opposite sides of the positioning hole; and
    two locking units are formed at an end portion of the rotating stick, protrude from an outer surface of the rotating stick and are located opposite to each other, and are respectively disposed in the two angle limiting grooves.

5. The dual axis slider hinge as claimed in claim 3, wherein:
    two curved grooves are formed on the connecting plug of each one of the two holders, and the two curved grooves are respectively recessed from two opposite lateral surfaces of said connecting plug; and
    two curved tracks are respectively formed in each one of the two sockets and protrude from the two opposite lateral walls of said socket, and each one of the two curved tracks is located between the inlet and a corresponding one of the two straight tracks; the two curved tracks are respectively disposed in the two curved grooves.

6. The dual axis slider hinge as claimed in claim 4, wherein:
    two curved grooves are formed on the connecting plug of each one of the two holders, and the two curved grooves are respectively recessed from two opposite lateral surfaces of said connecting plug; and
    two curved tracks are respectively formed in each one of the two sockets and protrude from the two opposite lateral walls of said socket, and each one of the two curved tracks is located between the inlet and a corresponding one of the two straight tracks; the two curved tracks are respectively disposed in the two curved grooves.

7. The dual axis slider hinge as claimed in claim 5, wherein:
    an engaging recess is formed on an end portion of the connecting plug of each one of the two holders, and two pivot pins respectively protrude from two lateral wall surfaces in the engaging recess; and
    two pivot slots are respectively formed on and recessed from two opposite lateral surfaces of the holder connecting portion of each one of the two sliders, and the two pivot slots extend along a direction perpendicular to extending directions of the two lateral sliding grooves; the two pivot pins are movably mounted in the two pivot slots respectively.

8. The dual axis slider hinge as claimed in claim 6, wherein:
    an engaging recess is formed on an end portion of the connecting plug of each one of the two holders, and two pivot pins respectively protrude from two lateral wall surfaces in the engaging recess; and
    two pivot slots are respectively formed on and recessed from two opposite lateral surfaces of the holder connecting portion of each one of the two sliders, and the two pivot slots extend along a direction perpendicular to extending directions of the two lateral sliding grooves; the two pivot pins are movably mounted in the two pivot slots respectively.

9. The dual axis slider hinge as claimed in claim 7, wherein the combining portion of each one of the two holders is a board, and multiple combining holes are formed through the board.

10. The dual axis slider hinge as claimed in claim 8, wherein the combining portion of each one of the two holders is a board, and multiple combining holes are formed through the board.

* * * * *